(12) United States Patent
Huynh-Romine et al.

(10) Patent No.: US 12,511,251 B2
(45) Date of Patent: Dec. 30, 2025

(54) UNIVERSAL SYNCHRONOUS FIFO IP CORE FOR FIELD PROGRAMMABLE GATE ARRAYS

(71) Applicant: Raytheon Company, Arlington, VA (US)

(72) Inventors: Vivian V. Huynh-Romine, El Segundo, CA (US); John Mui, El Segundo, CA (US); Howard K. Luu, El Segundo, CA (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 17/232,634

(22) Filed: Apr. 16, 2021

(65) Prior Publication Data

US 2022/0335004 A1 Oct. 20, 2022

(51) Int. Cl.
*G06F 15/78* (2006.01)
*G06F 30/34* (2020.01)

(52) U.S. Cl.
CPC ...... *G06F 15/7867* (2013.01); *G06F 15/7842* (2013.01); *G06F 15/7871* (2013.01); *G06F 15/7892* (2013.01); *G06F 30/34* (2020.01)

(58) Field of Classification Search
CPC .............................. G06F 30/34; G06F 15/7892
See application file for complete search history.

(56) References Cited

U.S. PATENT DOCUMENTS

| 7,536,669 | B1* | 5/2009 | Anderson | G06F 30/34 710/308 |
| 7,984,412 | B1* | 7/2011 | Schumacher | G06F 30/34 716/108 |
| 2013/0007677 | A1* | 1/2013 | Nilkund | G06F 30/33 716/102 |
| 2013/0185542 | A1* | 7/2013 | Mejdrich | G06F 15/8038 712/214 |
| 2019/0079761 | A1* | 3/2019 | Deame | G06F 9/3005 |
| 2020/0272730 | A1* | 8/2020 | Liang | G06F 9/45558 |

FOREIGN PATENT DOCUMENTS

WO 2022220887 10/2022

OTHER PUBLICATIONS

"FIFO Generator v13.2 LogiCORE IP Product Guide", Oct. 4, Xilinx (Year: 2017).*

(Continued)

*Primary Examiner* — Courtney P Spann
(74) *Attorney, Agent, or Firm* — Schwegman Lundberg & Woessner, P.A.

(57) ABSTRACT

A field programmable gate array (FPGA) device including a configuration interface arranged to receive configuration data from an FPGA programmer. The FPGA device includes a plurality of random access memory (RAM) types, including a first RAM type and a second RAM type, arranged to store the configuration or image data. The FPGA device also includes a FIFO IP core arranged to implement a FIFO function in a plurality of different FPGA platforms. The FIFO IP core is: i) configured to implement the FIFO in the FPGA device based on the configuration data, and ii) configurable to store the configuration data in one or both of the first RAM type and the second RAM type.

20 Claims, 7 Drawing Sheets

(56) References Cited

OTHER PUBLICATIONS

"UltraScale Architecture Libraries Guide", Dec. 20, Xilinx (Year: 2017).*

Yingxiao Zhao, Xin Liu, and Jiong Yang, "A resource and timing optimized PCIe DMA architecture using FPGA internal data buffer", Jan. 10, IEICE Electronics Express, vol. 16, pp. 1-12 (Year: 2019).*

Miss Sarika Dighe and Prof. R.A.Pagare, "FPGA Based Data Transfer Using Multi-Port Memory Controller", Apr. 23, IEEE, pp. 1-3 (Year: 2015).*

Johannes, et al., "hlslib: Software Engineering for Hardware Design," Arxiv.org, Cornell University Library, 201 Olin Library Cornell University Ithaca, NY 14853, Oct. 10, 2019 (Oct. 10, 2019), XP081513421, Section III.A.

Voss, et al., "Memory Mapping for Multi-Die FPGAs," 2019 IEEE 27th Annual International Symposium on Field-Programmable Custom Computing Machines (FCCM), IEEE, Apr. 28, 2019 (Apr. 28, 2019), pp. 78-86, XP033560212, DOI: 10.1109/FCCM.2019-00021.

International Preliminary Report on Patentability in Application No. PCT/US2021/065848 dated Oct. 26, 2023, 7 pages.

"International Application Serial No. PCT US2021 065848, International Search Report mailed Apr. 19, 2022", 3 pgs.

"International Application Serial No. PCT US2021 065848, Written Opinion mailed Apr. 19, 2022", 5 pgs.

Xilinx, "FIFO Generator v13.1 LogiCORE IP Product Guide Vivado Design Suite", Retrieved from the Internet: URL: https: www.xilinx.com support documentation ip_documentation fifo_generator v13_1 pg057-fifo-generator.pdf [retrieved on Mar. 31, 2022], (Apr. 5, 2017), 218 pgs.

* cited by examiner

```
module sFifoFwftBlkUltraRam (//Inputs
                     clk,                          //system clock
                     reset,                        //sync reset
                     wr,                           //write strobe
                     wrData,                       //write data
                     rd,                           //read strobe
                     //outputs
                     rdData,                       //read data
                     val,                          //read data valid
                     full,                         //full flag
                     almost_full,                  //almost full flag
                     empty,                        //empty flag
                     almost_empty,                 //almost empty flag
                     data_count
                     );

parameter ASIZE                = 4;   //2^4 is depth size of FIFO
  parameter DSIZE                = 32;  //FIFO data bit-width
502 parameter ALMOST_EMPTY_COUNT = 3;   //Number of words in FIFO when almost empty flag set
  parameter ALMOST_FULL_COUNT    = 3;   //Number of words can write to FIFO when almost full flag set
  parameter USE_DIST_RAM         = 0;   //1: use LUT RAM, 0: use block RAM, >1: use UltraRAM
```

FIG. 5

```
//Inputs
input           clk;                    //system clock
input           reset;                  //sync reset
input           wr;                     //write strobe
input [DSIZE-1:0] wrData;               //write data
input           rd;                     //read strobe
//outupts
output [DSIZE-1:0] rdData;              //read data
output          val;                    //read data valid
output          full;                   //full flag
output          almost_full;            //almost full flag
output          empty;                  //empty flag
output          almost_empty;           //almost empty flag
output [ASIZE:0] data_count;
```

UNIVERSAL SYNCHRONOUS FIFO IP CORE FOR FIELD PROGRAMMABLE GATE ARRAYS

TECHNICAL FIELD

This application relates generally to integrated circuits and, more particularly, to programming a field programmable gate array (FPGA).

BACKGROUND

FPGA provides field programmable processing circuitry that enables more rapid development and deployment of application-specific processing functions within electronic equipment. FPGAs typically use sets of look-up tables (LUTs) that are configurable using configuration random access memory (CRAM). CRAM typically uses static RAM (SRAM) that includes configuration information used to configure and route multiple LUTs within an FPGA to realize one or more application-specific processing functions of the FPGA chip. SRAM typically uses latching circuitry called a memory cell to store each bit of information.

A FPGA chip includes a programming or configuration interface to enable a programmer to read the FPGA configuration and configure the processing functions of the FPGA by setting the CRAM information which, in turn, configures one or more LUTs of the FPGA chip. Hardware description language (HDL) is commonly used FPGA programming languages. Each information bit within CRAM is typically stored as a logical 1 or 0 depending on the state of a corresponding SRAM latching circuit or memory cell element. Typical manufacturers of FPGA devices include the Xilinx® and Intel® corporations. One very commonly used components in FPGA is synchronous first in, first out (FIFO).

Unfortunately, in order to use the Xilinx® BRAM or LUT RAM FIFO, one can instantiate the synchronous FIFOs in IP catalog, or IP integrator catalog (block design) through the Xilinx® GUI Vivado, or instantiate XPM_FIFO_SYNC macro. In order to use the Xilinx® URAM FIFO, it depends on the family of product, one can instantiate the XPM_FIFO_SYNC macro or using IP catalog (only for some families of product). To switch between these types of Xilinx® RAM, one needs to change the instantiation of the FIFO IP core. In order to use Intel® BRAM or distributed RAM, one can instantiate FIFOs in an IP catalog or block editor. All the above methods cannot be implemented across vendors. For both Xilinx® and Intel®, to program BRAM or distributed RAM FIFO, an IP catalog GUI is typically used. This might require changes for different development tools (e.g., Xilinx® Vivado or Intel® Quartus versions). To use Xilinx® UltraRAM FIFO for the UltraScale Plus family, one must use the Xilinx® Parameterized Macro XPM_FIFO_SYNC (detail in Xilinx® UG974). To use Xilinx® UltraRAM FIFO for the ACAP family, one can use the Xilinx® Parameterized Macro XPM_FIFO_SYNC or IP catalog GUI. To change from one vendor to the other, or to change from one family product to another, or to change tool versions, all the above methods have proven to be cumbersome.

Thus, there is a need for more rapid, more efficient, and more flexible approaches to coding FIFOs among different FPGA manufacturers. Furthermore, there is a need for flexible coding of different versions or families of FPGAs implemented by the same manufacturer. There is a need to have a simple way to specify what type of RAM we would like to use for the synchronous FIFO. There is also a need for improving the performance of FPGA devices while also reducing FPGA implementation costs and application development cycles or development periods.

SUMMARY

The application, in various implementations, addresses deficiencies associated with application-specific programming of various manufacturer types or versions of FPGA devices and/or chips.

This application describes an exemplary digital synchronous FIFO IP core that: 1) works across the two most popular FPGA vendors: Xilinx® and Intel® by changing one line of code (synthesis directive) per each type of RAM, 2) works across different product families in both vendors, 3) works across different types of RAMs in both vendors, 4) enables efficient and/or easy switching between different types of RAMs by changing one parameter and, 5) provides simple standard IO ports. The inventive synchronous FIFO IP core described herein works for many FPGA product families, such as, in both Xilinx® and Intel® FPGAs, and may work among other FPGA manufactures. The synchronous FIFO IP core is advantageously configurable to utilize, for example, Xilinx® or Intel® BRAM, Xilinx® or Intel® distributed RAM (i.e., LUT RAM), and Xilinx® URAM, which eliminates the need to change FIFO IP code when changing FPGA manufacturers, families, or versions.

An exemplary digital synchronous FIFO IP core is portable, flexible, and has a user-friendly interface. It requires zero to minimum changes when switching vendors, family products, tool versions, and RAM types. The exemplary FIFO IP core advantageously improves aspects of an FPGA design including: 1) reducing and balancing FPGA resource utilization, 2) enabling code to fit into many different FPGAs, 3) reducing FPGA implementation time, 4) improving FPGA timing closure, and 5) reducing development and maintenance time, which helps scheduling & budgeting.

In one aspect, a FPGA device includes a configuration interface arranged to receive data from an FPGA programmer. The FPGA device includes a plurality of random access memory (RAM) types, such as a first RAM type and a second RAM type, arranged to store the data. The FPGA device also includes a FIFO IP core arranged to implement a FIFO function in a plurality of different FPGA platforms. The FIFO IP core is: i) configured to implement the FIFO in the FPGA device based on the parameters, and ii) configurable to store the data in one or both of the first RAM type and the second RAM type.

In one implementation, the FIFO IP core is configured to store data in the at least one of the first RAM type and the second RAM type to balance the resource utilization and improve timing. The FIFO IP core may be configured to map the FIFO implementation among the first RAM type and the second RAM type in order to balance resource utilization and to improve timing. The first RAM type may include block RAM and the second RAM type may include distributed RAM. The plurality of RAM types may include a third RAM type, where the FIFO IP core is further configurable to store data in any combination of the first RAM type, the second RAM type, and the third RAM type. The third RAM type may include UltraRAM (URAM).

The FPGA platform may include an FPGA type manufactured by, for example, Xilinx® corporation or Intel® corporation. The FPGA type may include a model, family product or version the FPGA platform. The FPGA development tools include an IP catalog graphical user interface (GUI). The code may be written in Verilog hardware description language (HDL). The Verilog HDL may be based on the IEEE 1364 standard.

In another aspect, a method for configuring an FPGA device implementing a universal and/or synchronous FIFO IP core includes: configuring the FIFO IP core to implement the FIFO function in the FPGA device; interfacing an FPGA programmer, via a communications interface, with the FPGA device; imaging the FPGA device with image data arranged to implement the universal FIFO IP core in the FPGA device, where the universal FIFO IP core is configurable to implement a FIFO function in a plurality of FPGA platforms; and storing the image data in at least one of a first RAM type and a second RAM type in the FPGA device.

A further aspect includes a non-transient computer readable medium containing program instructions for causing a computer to implement a universal synchronous FIFO IP core in an FPGA device comprising the method of: configuring the FIFO IP core to implement the FIFO function in the FPGA device based on the configuration data; interfacing with an FPGA programmer, via a communications interface, by the FPGA device; imaging the FPGA device with image data arranged to implement the universal FIFO IP core in the FPGA device, where the universal FIFO IP core is configurable to implement a FIFO function in a plurality of FPGA platforms; and storing the image data in at least one of a first RAM type and a second RAM type in the FPGA device.

Any two or more of the features described in this specification, including in this summary section, may be combined to form implementations not specifically described in this specification. Furthermore, while this specification may refer to examples of systems and methods related to space, the implementations and methods herein equally apply to land, sea, and underwater systems. The implementations herein also apply equally to fixed facilities or systems that may be subject to extreme environmental stresses or conditions.

The details of one or more implementations are set forth in the accompanying drawings and the following description. Other features and advantages will be apparent from the description and drawings, and from the claims.

DESCRIPTION OF THE DRAWINGS

Like reference numerals in different figures indicate like elements.

DETAILED DESCRIPTION

The application, in various implementations, addresses deficiencies associated with application-specific programming of various manufacturer types or versions of FPGA devices and/or chips.

Figure 1:
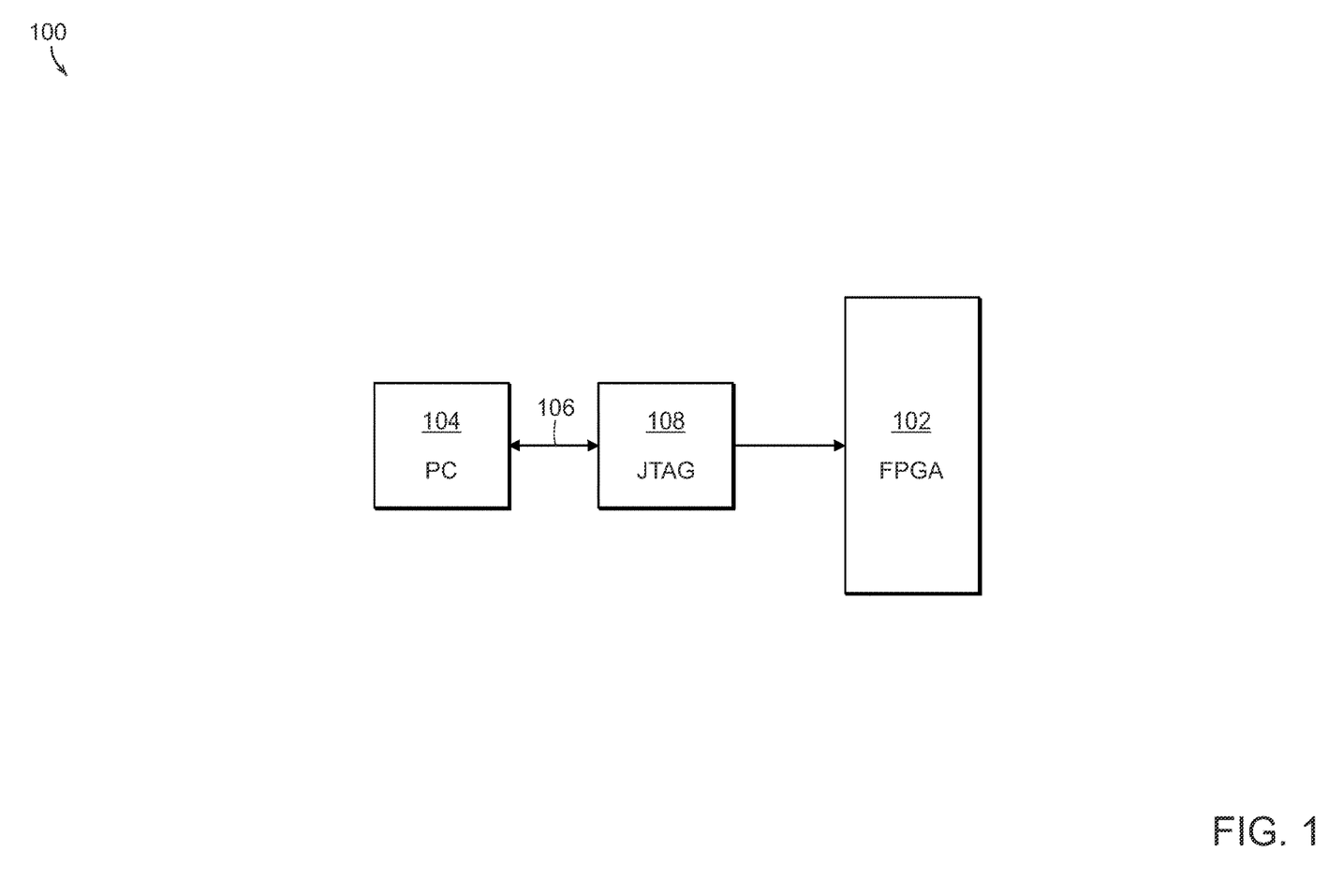
FIG. 1 is a block diagram of an exemplary FPGA programming interface.

FIG. 1 is a diagram of an exemplary FPGA programming interface 100 arranged to image and/or program FPGA 102. FPGA programming interface 100 includes a FPGA programmer and/or personal computer (PC) 104, Joint Test Action Group (JTAG) programming cable 106, and JTAG connector 108. PC 104 may include an IP Catalog GUI to facilitate imaging and/or programming of FPGA 102. For example, PC 104 may include Xilinx® ISE software for generating code based on Verilog HDL or VHDL within FPGA 102. The HDL code may include a version of Verilog. JTAG connector 108 may implement a JTAG IEEE 1149.1 interface between PC 104 and FPGA 102.

FPGA 102 may include a configuration interface arranged to receive configuration and/or image data from PC 104. FPGA 102 may include multiple random RAM types such as, without limitation, distributed RAM, block RAM (BRAM), and UltraRAM (URAM). PC 104 may image FPGA 102 with a FIFO IP core to implement a FIFO function. The FIFO IP core may be configured to operate within various different FPGA platforms. The FIFO IP core may be configured to implement the FIFO function in FPGA 102 based on the configuration and/or image data of the FIFO IP core that was, for example, set via an IP Catalog GUI running on PC 104. The FIFO IP core imaged within FPGA 102 is also configurable to store the configuration, image, and/or FIFO IP core code in any one or combination of the RAM types available within FPGA 102. Configuration and/or image data may include code and/or instructions that implement a function within FPGA 102 such as, for example, the synchronous FIFO IP core that implements a FIFO function.

FPGA 102 may include an FPGA device manufactured by Xilinx® Corporation, Intel® Corporation, or another manufacturer. FPGA 102 may be one of various FPGA types that include various models, family products or versions of a FGPA platform. Verilog HDL may be based on the IEEE 1364 standard. A manufacture GUI running on PC 104 may perform various functions including: checking code syntax, performing code simulations, performing synthesis based on the FPGA platform of FPGA 102, performing implementations (e.g. placing and routing, close timing), and generating a bit stream that implements, for example, a synchronous FIFO IP core within FPGA 102.

Figure 2:
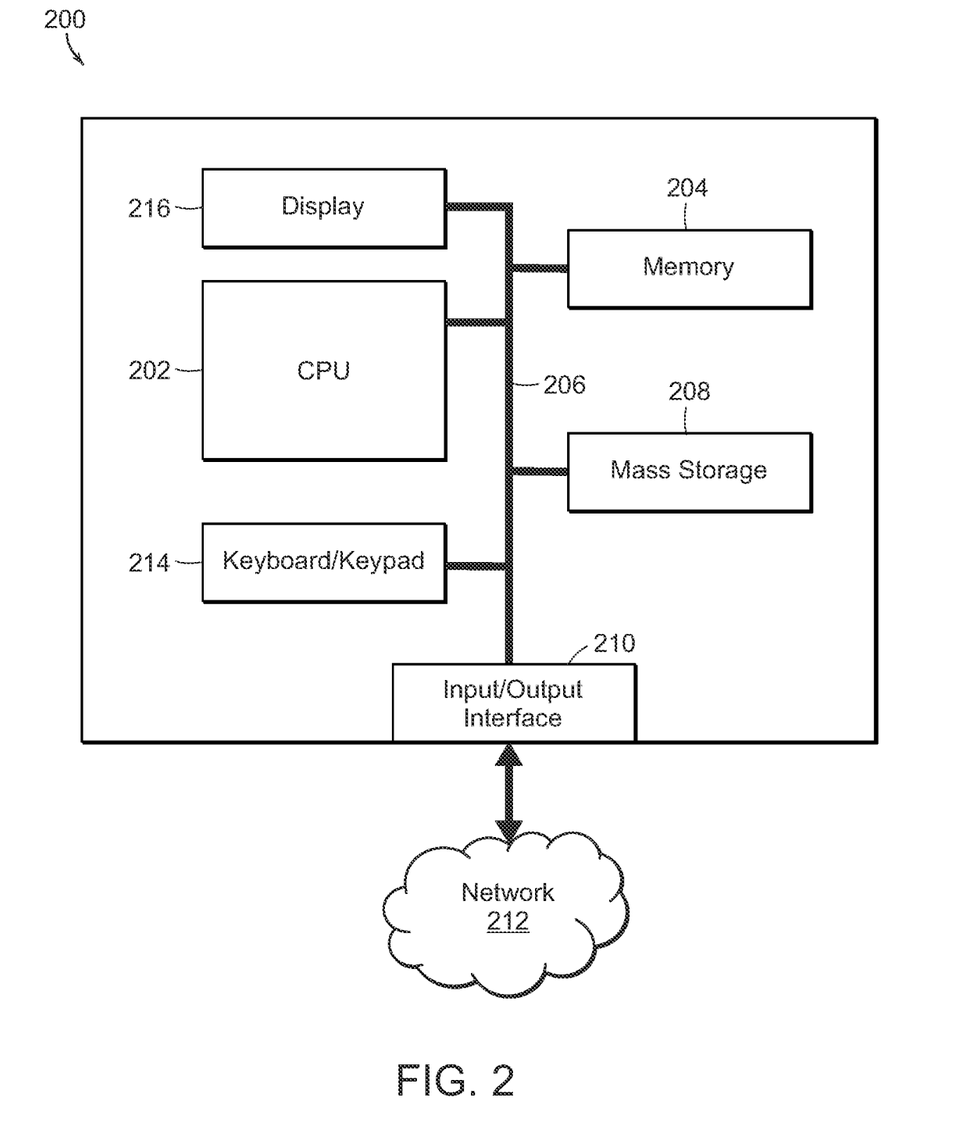
FIG. 2 shows a diagram of a computer system arranged to perform FPGA programming.

FIG. 2 is block diagram of a computer system 200 arranged to perform processing associated with PC 104 and/or an FPGA programming interface 100, which are discussed in detail later herein. The exemplary computer system 200 includes a central processing unit (CPU) 202, a memory 204, and an interconnect bus 206. The CPU 202 may include a single microprocessor or a plurality of microprocessors or special purpose processors for configuring computer system 200 as a multi-processor system. The memory 204 illustratively includes a main memory and a read only memory. The computer 200 also includes the mass storage device 208 having, for example, various disk drives, tape drives, etc. The memory 204 also includes dynamic random access memory (DRAM) and high-speed cache memory. In operation, memory 204 stores at least portions of instructions and data for execution by the CPU 202. The memory 204 may also contain compute elements, such as Deep In-Memory Architectures (DIMA), wherein data is sent to memory and a function of the data (e.g., matrix vector multiplication) is read out by the CPU 202.

The mass storage 208 may include one or more magnetic disk, optical disk drives, and/or solid state memories, for storing data and instructions for use by the CPU 202. At least one component of the mass storage system 208, preferably in the form of a non-volatile disk drive, solid state, or tape drive, stores the database used for processing data and controlling functions of FPGA programming interface 100 and/or PC 104. The mass storage system 208 may also include one or more drives for various portable media, such as a floppy disk, flash drive, a compact disc read only memory (CD-ROM, DVD, CD-RW, and variants), memory stick, or an integrated circuit non-volatile memory adapter (i.e. PC-MCIA adapter) to input and output data and code to and from the computer system 200.

The computer system 200 may also include one or more input/output interfaces for communications, shown by way of example, as interface 210 and/or a transceiver for data communications via the network 212. The data interface 210 may be a modem, an Ethernet card or any other suitable data communications device. To provide the functions of a processor according to FIG. 1, the data interface 210 may provide a relatively high-speed link to a network 212, such as an intranet, internet, FPGA programming and/or testing network, or the Internet, either directly or through another external interface. The communication link to the network 212 may be, for example, optical, wired, or wireless (e.g., via satellite or cellular network). The computer system 200 may also connect via the data interface 210 and network 212 to at least one other computer system to perform remote or distributed FPGA programming. Alternatively, the computer system 200 may include a mainframe or other type of host computer system capable of Web-based communications via the network 212. The computer system 200 may include software for operating a network application such as a web server and/or web client.

The computer system 200 may also include suitable input/output ports, that may interface with a portable data storage device, or use the interconnect bus 206 for interconnection with a local display 216 and keyboard 214 or the like serving as a local user interface for programming and/or data retrieval purposes. The display 216 may include a touch screen capability to enable users to interface with the system 200 by touching portions of the surface of the display 216. Server operations personnel may interact with the system 200 for controlling and/or programming the system from remote terminal devices via the network 212.

The computer system 200 may run a variety of application programs and store associated data in a database of mass storage system 208. One or more such applications may include an IP Catalog GUI and/or FPGA programming interface 100 such as described with respect to FIG. 1.

The components contained in the computer system 200 may enable the computer system to be used as a server, workstation, personal computer, network terminal, mobile computing device, mobile telephone, System on a Chip (SoC), and the like. As discussed above, the computer system 200 may include one or more applications such as FPGA programming, imaging, and/or coding. The system 200 may include software and/or hardware that implements a web server application. The web server application may include software such as HTML, XML, WML, SGML, PHP (Hypertext Preprocessor), CGI, and like languages.

The foregoing features of the disclosure may be realized as a software component operating in the system 200 where the system 200 includes Unix workstation, a Windows workstation, a LINUX workstation, or other type of workstation. Other operation systems may be employed such as, without limitation, Windows, MAC OS, and LINUX. In some aspects, the software can optionally be implemented as a C language computer program, or a computer program written in any high level language including, without limitation, Javascript, Java, CSS, Python, Keras, TensorFlow, PHP, Ruby, C++, C, Shell, C#, Objective-C, Go, R, TeX, VimL, Perl, Scala, CoffeeScript, Emacs Lisp, Swift, Fortran, Visual BASIC, HDL, VHDL, and/or one or more versions of Verilog. Certain script-based programs may be employed such as XML, WML, PHP, and so on. The system 200 may use a digital signal processor (DSP).

As stated previously, the mass storage 208 may include a database. The database may be any suitable database system, including the commercially available Microsoft Access database, and can be a local or distributed database system. A database system may implement Sybase and/or a SQL Server. The database may be supported by any suitable persistent data memory, such as a hard disk drive, RAID system, tape drive system, floppy diskette, or any other suitable system. The system 200 may include a database that is integrated with the system 100 or 300, however, it will be understood that, in other implementations, the database and mass storage 208 can be an external element.

In certain implementations, the system 200 may include an Internet browser program and/or be configured operate as a web server. In some configurations, the client and/or web server may be configured to recognize and interpret various network protocols that may be used by a client or server program. Commonly used protocols include Hypertext Transfer Protocol (HTTP), File Transfer Protocol (FTP), Telnet, and Secure Sockets Layer (SSL), and Transport Layer Security (TLS), for example. However, new protocols and revisions of existing protocols may be frequently introduced. Thus, in order to support a new or revised protocol, a new revision of the server and/or client application may be continuously developed and released.

In one implementation, the system 100 includes a networked-based, e.g., Internet-based, application that may be configured and run on any combination of the other components of the system 100. The computer system 200 may include a web server running a Web 2.0 application or the like. Web applications running on system 100 may use server-side dynamic content generation mechanisms such, without limitation, Java servlets, CGI, PHP, or ASP. In certain embodiments, mashed content may be generated by a web browser running, for example, client-side scripting including, without limitation, JavaScript and/or applets on a wireless device.

In certain implementations, system 100 may include applications that employ Verilog HDL, VHDL, asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting, e.g., JavaScript. Certain web-based applications and services may utilize web protocols including, without limitation, the services-orientated access protocol (SOAP) and representational state transfer (REST). REST may utilize HTTP with XML.

The system 100, computer system 200, or another component of systems 100 or 200 may also provide enhanced security and data encryption. Enhanced security may include access control, biometric authentication, cryptographic authentication, message integrity checking, encryption, digital rights management services, and/or other like security services. The security may include protocols such as IPSEC and IKE. The encryption may include, without limitation, DES, 3DES, AES, RSA, ECC, and any like public key or private key based schemes.

Figure 3:
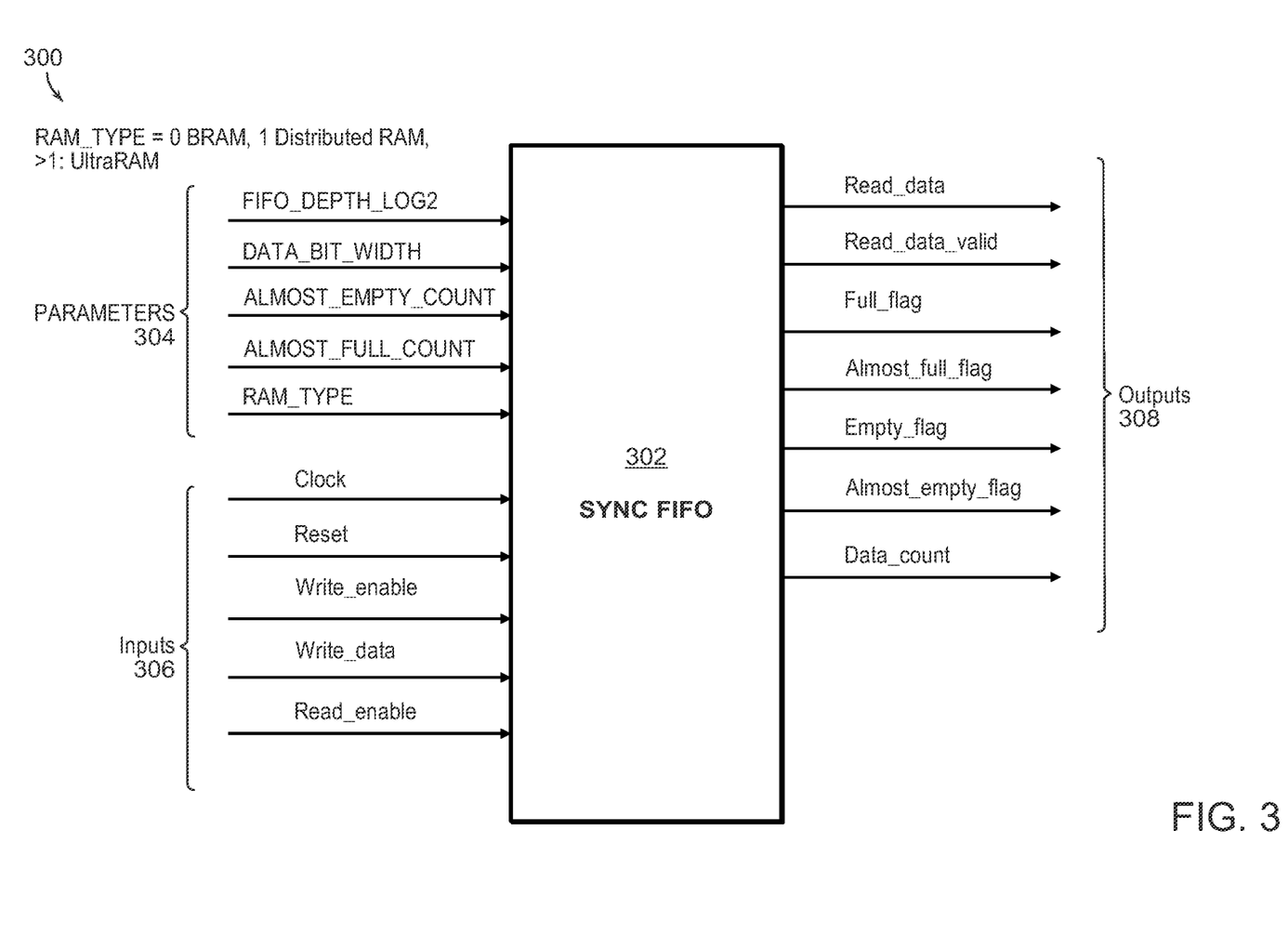
FIG. 3 shows a block diagram of a synchronous FIFO of an FPGA device.

FIG. 3 shows a block diagram 300 of a synchronous FIFO IP core 302 of an FPGA device such as FPGA 102. The FIFO IP core 302 includes configuration and/or image data such as input parameters 304. Image parameters 304 include FIFO_DEPTH_LOG2, DATA_BIT_WIDTH, ALMOST_EMPTY_COUNT, ALMOST_FULL_COUNT, and RAM_TYPE. The RAM_TYPE parameter is 0 for BRAM, 1 for distributed (LUT) RAM, and any value greater than 1 for URAM. Synchronous FIFO IP core 302 includes inputs 306. Inputs 306 include Clock, Reset, Write-enable, Write_data, and Read_enable. Outputs 308 include Read_data, Read_data_valid, Full_flag, Almost_full_flag, Empty_flag, Almost_empty flag, and Data_count. As previously discussed, an FPGA programmer can selectively configure the storage location of the synchronous FIFO IP core within a RAM type of FPGA 102 by setting the parameter 304 RAM_TYPE to 0, 1, a value greater than 1 to select BRAM, distributed RAM, or URAM respectively. Depending on the capabilities of the target FPGA, the FPGA resource utilization, place and route, and timing closure may be significantly enhanced depending on where the FIFO IP core code and/or image data is stored on the FPGA device. Such imaging flexibility provides a technically advantageous ability to optimize FPGA performance regardless of the FPGA version, product family, or manufacturer that implements the synchronous FIFO IP core. Although not shown in FIG. 3, to change between Xilinx® and Intel® based FPGAs, the implementation of the RAM can be configured by changing a synthesis directive, which may require only a single line of code for each type of RAM.

Figure 4:
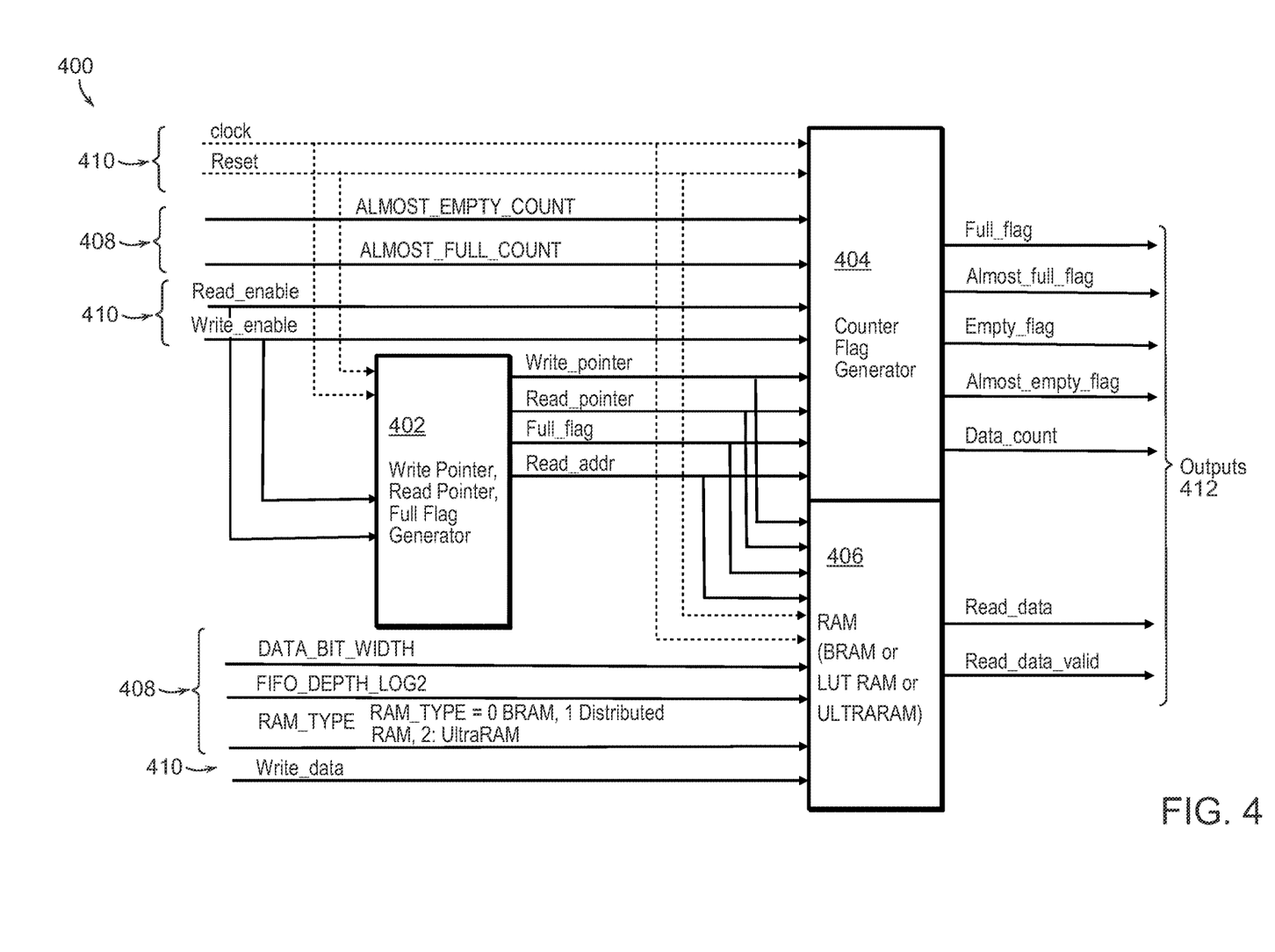
FIG. 4 shows a block diagram including functions of the synchronous FIFO of FIG. 3.

FIG. 4 shows a block diagram 400 including subfunctions 402, 404, and 406 of the synchronous FIFO IP core 302 of FIG. 3. Subfunction 402 includes a write pointer, read pointer, and full flag generator. Subfunction 404 includes a counter and a flag generator. Subfunction 406 includes RAM such as BRAM, LUT RAM, or UltraRAM. Parameters 408 correspond to parameters 304 of FIG. 3. Inputs 410 correspond to inputs 306 of FIG. 3. Outputs 412 correspond to outputs 308 of FIG. 3.

Figure 5:
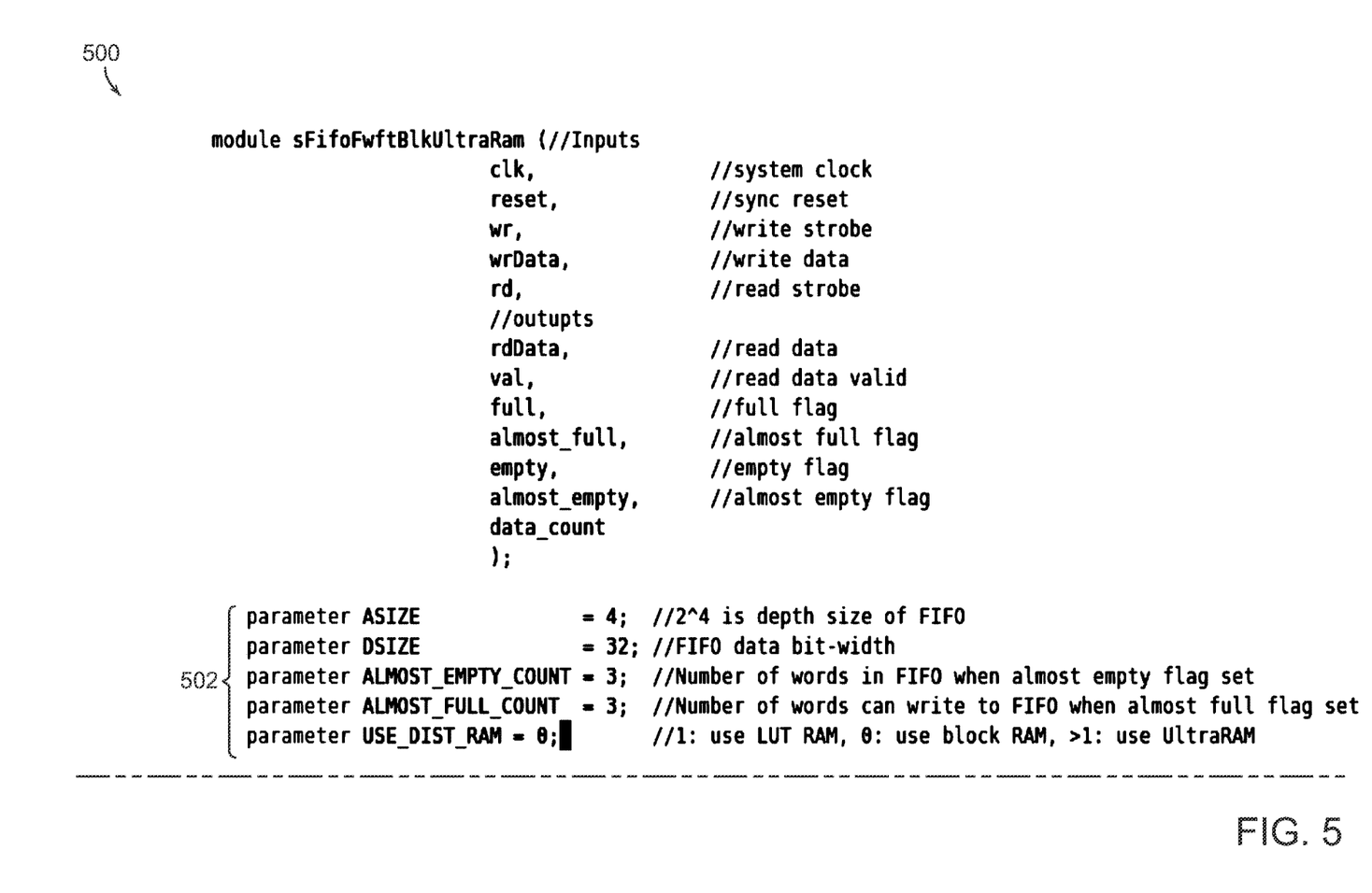
FIG. 5 shows source code used to implement the synchronous FIFO of FIG. 3 in an FPGA device.

FIG. 5 shows exemplary Verilog source code 500 used to implement the synchronous FIFO IP core 302 of FIG. 3 in an FPGA device such as FPGA 102. Code 500 includes configuration parameters 502 that correspond to parameters 304 of FIG. 3, inputs 504 that correspond to inputs 306 of FIG. 3, and outputs 506 that correspond to outputs 308 of FIG. 3.

Figure 6:
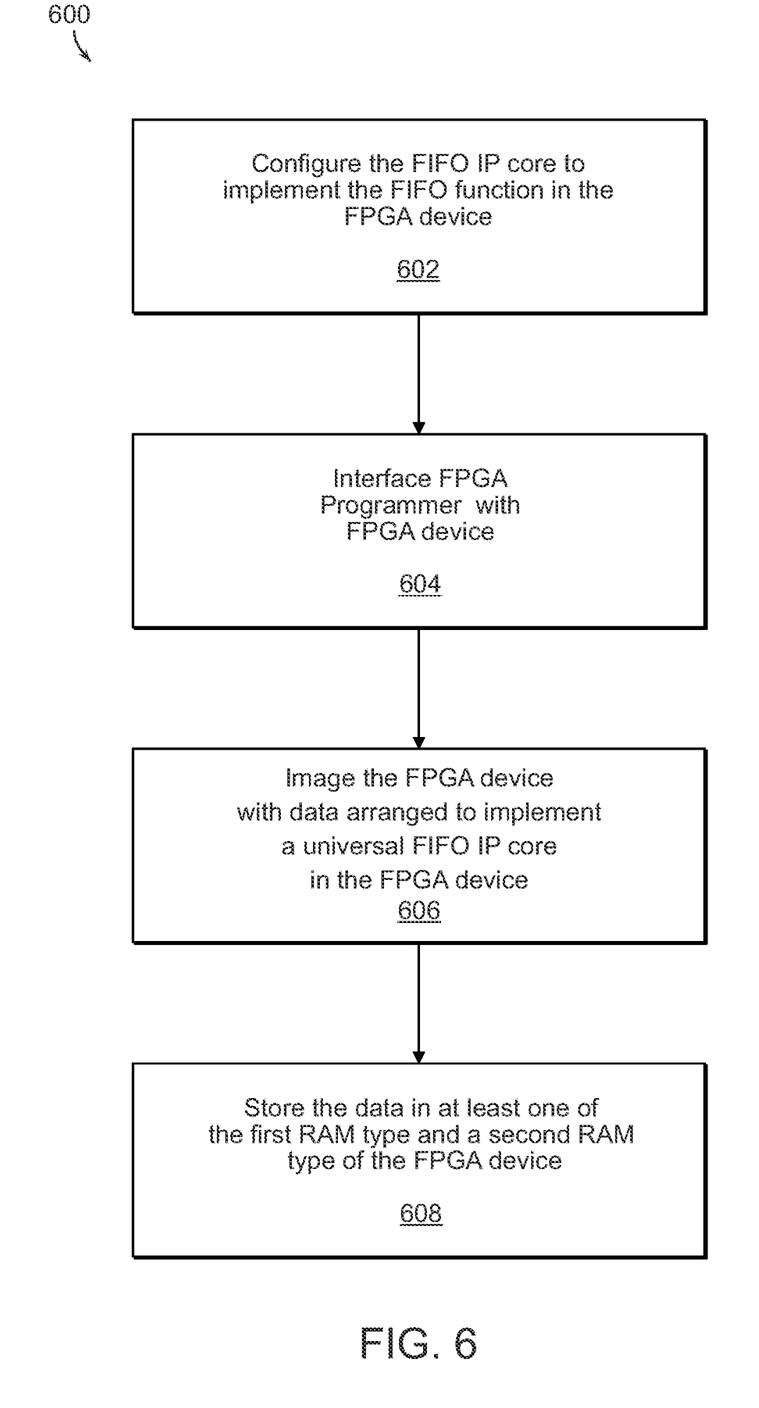
FIG. 6 shows a process for imaging an FPGA device with a universal FIFO IP core.

FIG. 6 shows a process 600 for imaging an FPGA device such as FPGA 102 with a universal FIFO IP core. Process 600 includes configuring the FIFO IP core, e.g., core 302, to implement the FIFO function in the FPGA 102 (Step 602). Process 600 also includes interfacing an FPGA programmer, e.g., an IP catalog GUI running on PC 104, via a communications interface such as JTAG 108, with an FPGA device such as FPGA 102 (Step 604). Then, imaging the FPGA 102 with data using a bit stream arranged to implement the universal and/or synchronous FIFO IP core in FPGA 102. The universal and/or synchronous FIFO IP core, e.g., FIFO IP core 302, is configurable to implement a FIFO function in various different FPGA platforms (Step 606). Process 600 also includes storing the data in at least one of a first RAM type and a second RAM type in the FPGA 102 (Step 608). The first RAM type may include distributed RAM and second RAM type may be BRAM or UltraRAM.

It will be apparent to those of ordinary skill in the art that certain aspects involved in the operation of the systems 100 and 200, and other devices such as device 102 may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, SRAM or flash memory device having a computer readable program code stored thereon.

Elements or steps of different implementations described may be combined to form other implementations not specifically set forth previously. Elements or steps may be left out of the systems or processes described previously without adversely affecting their operation or the operation of the system in general. Furthermore, various separate elements or steps may be combined into one or more individual elements or steps to perform the functions described in this specification.

Other implementations not specifically described in this specification are also within the scope of the following claims.

What is claimed is:

1. A field programmable gate array (FPGA) device comprising:
   a configuration interface arranged to receive data from an FPGA programmer;
   a plurality of random access memory (RAM) types, including a first RAM type and a second RAM type, arranged to store the data; and
   a first-in first-out (FIFO) intellectual property (IP) core arranged to implement a FIFO function in a plurality of different FPGA platforms, the FIFO IP core: i) implements the FIFO function in the FPGA device based on the data, and ii) stores portions of the data such that different first and second respective portions of the data are stored in both the first RAM type and the second RAM type, such that the first portion is stored in the first RAM type and the second portion is stored in the second RAM type, the FPGA device including a plurality of parameters in the data, the plurality of parameters including a RAM type parameter for selecting a storage location of the FIFO IP core within the plurality of RAM types by setting the RAM type parameter to numerical values, where the RAM type parameter comprises a different numerical value for each of the plurality of RAM types.

2. The FPGA device of claim 1, wherein the FIFO IP core is configured to store the data in at least one of the first RAM type and the second RAM type to balance resource utilization.

3. The FPGA device of claim 2, wherein the FIFO IP core is configured to store the data in at least one of the first RAM type and the second RAM type to improve routing and timing.

4. The FPGA device of claim 1, wherein the first RAM type includes a block RAM and the second RAM type includes a distributed RAM.

5. The FPGA device of claim 4, wherein the plurality of RAM types includes a third RAM type, the FIFO IP core stores the data in any combination of the first RAM type, the second RAM type, and the third RAM type, the third RAM type including an UltraRAM.

6. The FPGA device of claim 1, wherein at least one of the different FPGA platforms includes an FPGA type manufactured by one of two different FPGA manufacturers.

7. The FPGA device of claim 6, wherein the FPGA type includes one of a model, family product and version of the at least one of the different FPGA platforms.

8. The FPGA device of claim 1, wherein each of the different FPGA platforms comprises a FPGA development suite having an IP catalog graphical user interface (GUI).

9. The FPGA device of claim 1, wherein data is formed by Verilog hardware description language (HDL).

10. The FPGA device of claim 9, wherein the Verilog HDL is based on Institute of Electrical and Electronics Engineers (IEEE) 1364 standard.

11. A method for configuring a field programmable gate array (FPGA) device implementing a universal first-in first-out (FIFO) intellectual property (IP) core comprising:
configuring the universal FIFO IP core to implement a FIFO function in the FPGA device;
interfacing an FPGA programmer, via a communications interface, with the FPGA device;
imaging the FPGA device with data arranged to implement the universal FIFO IP core in the FPGA device, the universal FIFO IP core configured to implement the FIFO function in a plurality of FPGA platforms; and
storing portions of the data such that different first and second respective portions of the data are stored in both a first RAM type and a second RAM type in the FPGA device, such that the first portion is stored in the first RAM type and the second portion is stored in the second RAM type, the FPGA device including a plurality of parameters in the data, the plurality of parameters including a RAM type parameter for selecting storage locations of the universal FIFO IP core within the first RAM type or the second RAM type by setting the RAM type parameter to a numerical value, where the RAM type parameter comprises a different numerical value for each of the first RAM type and second RAM type.

12. The method of claim 11, wherein storing the data comprises storing the data in the first RAM type and the second RAM type to balance resource utilization.

13. The method of claim 12, wherein storing the data comprises storing the data in at least one of the first RAM type and the second RAM type to improve routing and timing.

14. The method of claim 11, wherein the first RAM type includes a block RAM and the second RAM type includes a distributed RAM.

15. The method of claim 14, wherein storing the data comprises storing the data in any combination of the first RAM type, the second RAM type, and a third RAM type, the third RAM type including an UltraRAM.

16. The method of claim 11 further comprising configuring the data with a synthesis directive to configure storage of the data based on at least one of the plurality of FPGA platforms.

17. The method of claim 11, wherein at least one of the plurality of FPGA platforms includes an FPGA type manufactured by one of two different FPGA manufacturers.

18. The method of claim 17, wherein the FPGA type includes one of a model, family product and version of the at least one of the plurality of FPGA platforms.

19. The method of claim 11, wherein each of the plurality of FPGA platforms comprises a FPGA development suite having an IP catalog graphical user interface (GUI).

20. A non-transient computer readable medium containing program instructions for causing a computer to implement a universal first-in first-out (FIFO) intellectual property (IP) core in a field programmable gate array (FPGA) device comprising operations:
configuring the universal FIFO IP core to implement a FIFO function in the FPGA device based on configuration data;
interfacing with an FPGA programmer, via a communications interface, by the FPGA device;
imaging the FPGA device with the configuration data arranged to implement the universal FIFO IP core in the FPGA device, the universal FIFO IP core configured to implement a FIFO function in a plurality of FPGA platforms; and
storing portions of the configuration data such that first and second different portions of the data are stored in both a first RAM type and a second RAM type in the FPGA device, such that the first portion is stored in the first RAM type and the second portion is stored in the second RAM type, the FPGA device including a plurality of parameters in the configuration data, the plurality of parameters including a RAM type parameter for selecting storage locations of the FIFO IP core within the first RAM type and the second RAM type, where the RAM type parameter comprises a different numerical value for each of the first RAM type and the second RAM type.

* * * * *